Sept. 25, 1951  J. G. LEE  2,568,812
AIRCRAFT CONTROL MEANS
Filed Oct. 27, 1945  3 Sheets-Sheet 1
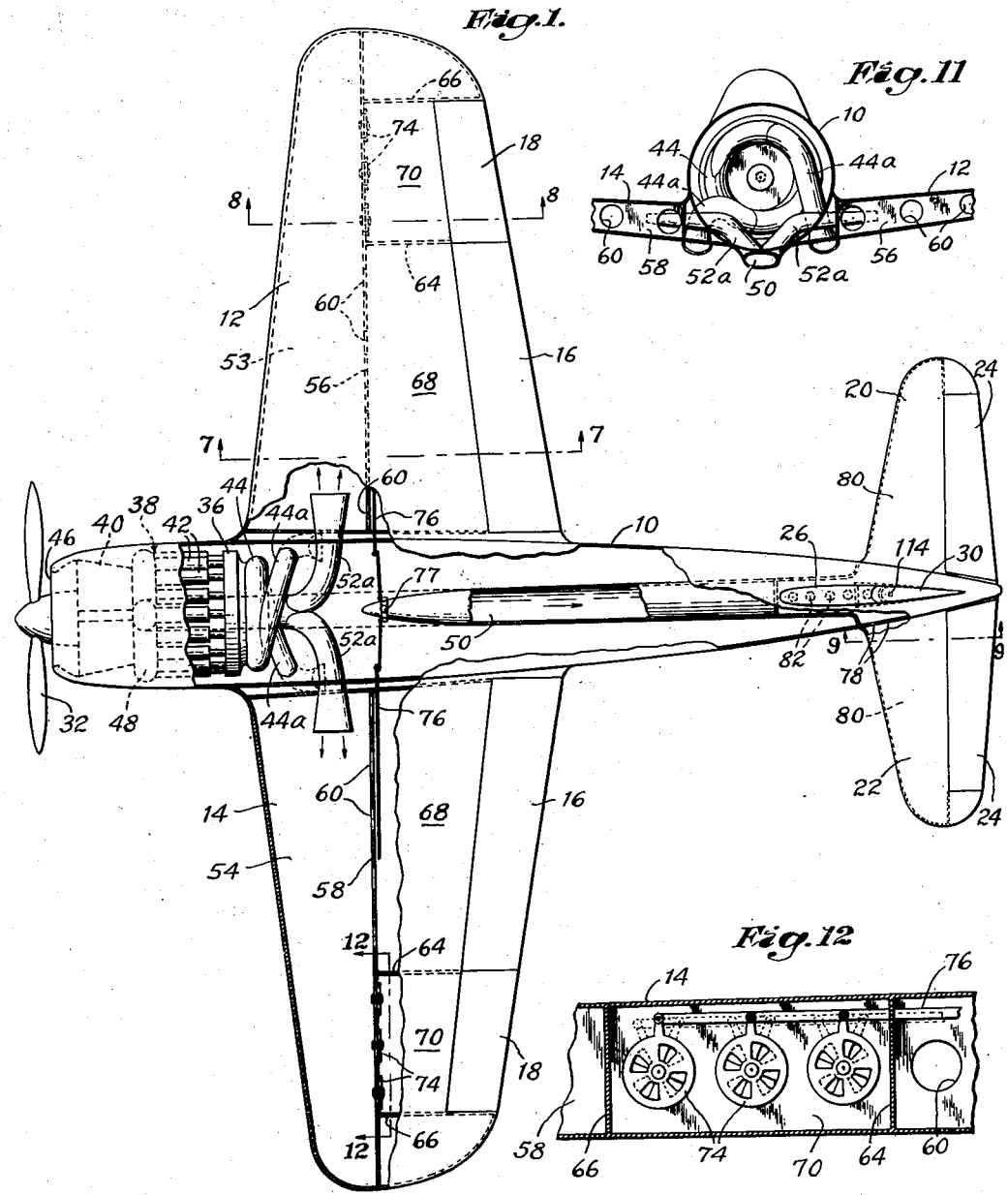
INVENTOR
John G. Lee
BY M. B. Tasker
Attorney

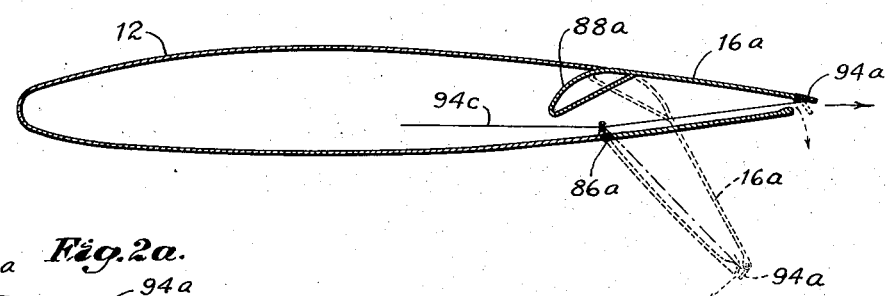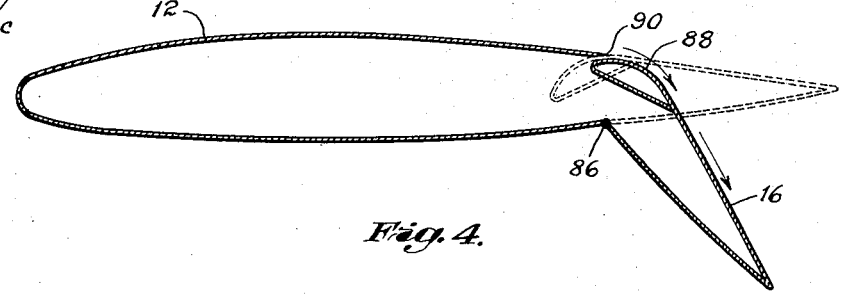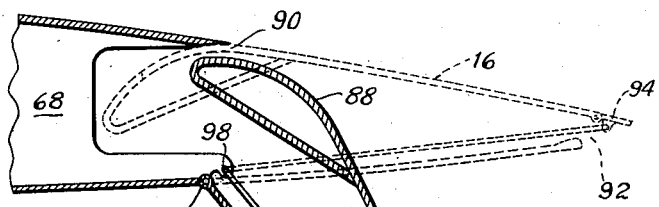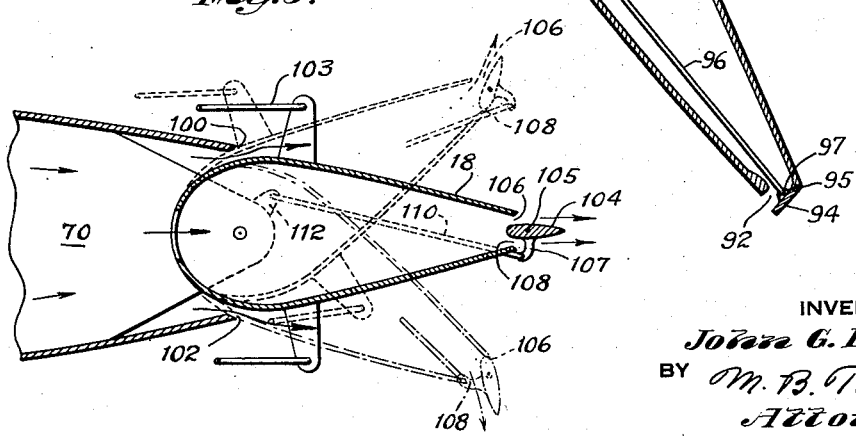

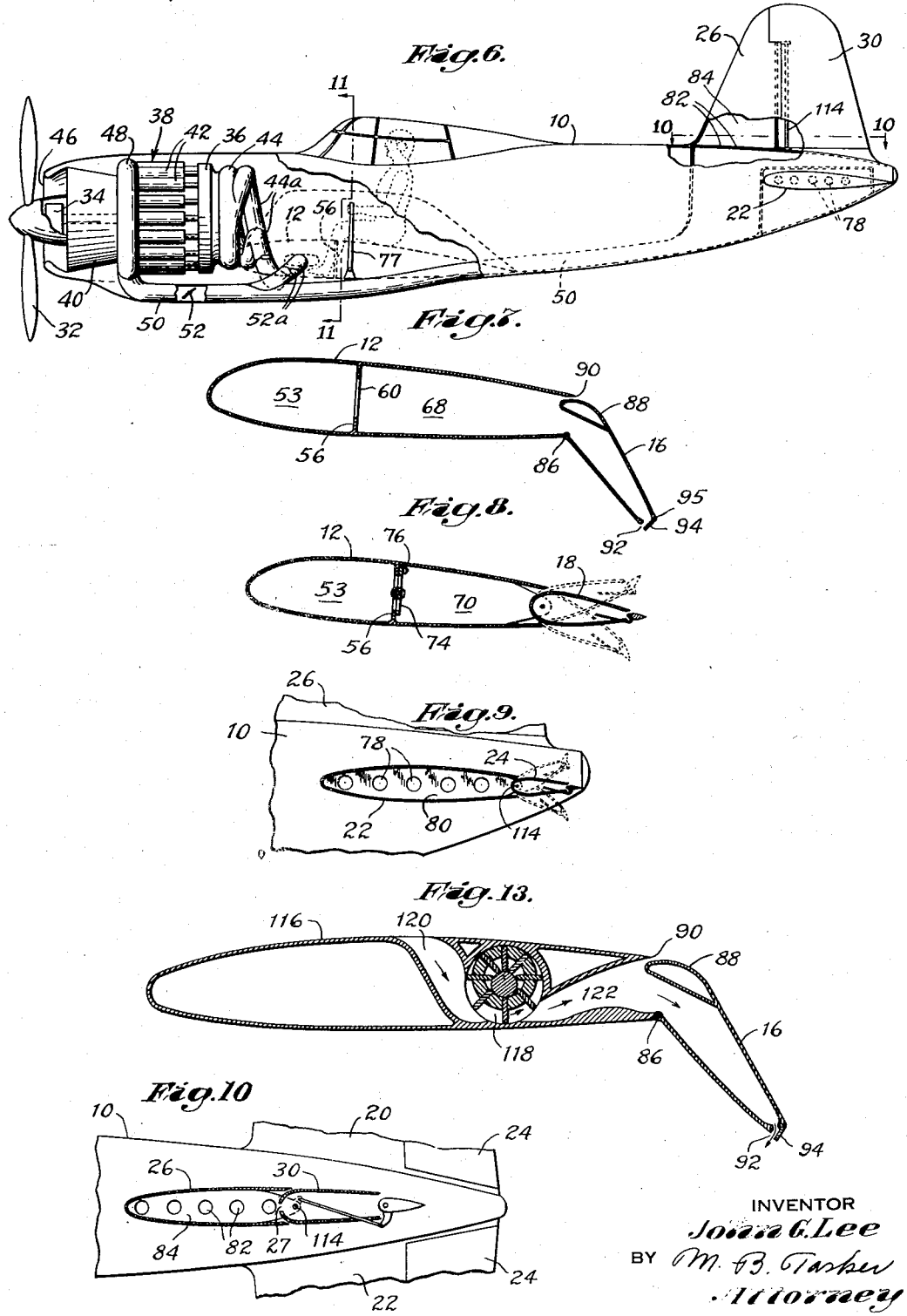

Patented Sept. 25, 1951

2,568,812

UNITED STATES PATENT OFFICE 2,568,812

AIRCRAFT CONTROL MEANS

John G. Lee, Farmington, Conn., assignor to United Aircraft Corporation, East Hartford, Conn., a corporation of Delaware Application October 27, 1945, Serial No. 625,056

8 Claims. (Cl. 244—52)

1

This invention relates to directional or lift control means for aircraft.

It is an object of the invention to provide an aircraft having a propulsive or lift regulating jet and an auxiliary airfoil, such as an aileron, flap, rudder or elevator for controlling said jet.

Another object of the invention is to provide an airfoil having jet directing orifice means located adjacent the leading and/or trailing edge thereof controlled by movements of the airfoil.

A further object of the invention is to provide improved fluid jet means for increasing the effectiveness of an aircraft control surface.

A still further object of the invention is to provide improved fluid jet means for controlling the energy losses in the boundary layer of airfoils having pivoted trailing edge jet controlling airfoil sections.

A further object of the invention is generally to improve control means for aircraft.

Other objects and advantages of the invention will be evident from the following detailed description of several specific embodiments of the invention shown in the accompanying drawings which are submitted for purposes of illustration only, and are not intended to define the scope of the invention, reference being had to the appended claims for that purpose.

In the drawings,

Fig. 1 is a plan view of an airplane embodying the invention, parts of the fuselage and wing structure being broken away to facilitate illustration;

Fig. 2 is a diagrammatic sectional view of a jet directing slot on the trailing edge of a flap;

Fig. 2a is an enlarged detail view of the tab for controlling the slot of Fig. 2;

Fig. 3 is a diagrammatic sectional view of a jet directing slot at the leading edge of a flap;

Fig. 4 is a view showing a flap having jet directing slots at both leading and trailing edges;

Fig. 5 is a sectional view showing a control surface movable on either side of a neutral position such as an aileron, elevator, or rudder having leading and trailing edge jet directing slots;

Fig. 6 is a side elevation of the airplane of Fig. 1 with one wing and parts of the fuselage broken away;

Fig. 7 is a section on line 7—7 of Fig. 1;

Fig. 8 is a section on line 8—8 of Fig. 1;

Fig. 9 is a section on line 9—9 of Fig.1;

Fig. 10 is a section on line 10—10 of Fig. 6 on an enlarged scale;

Fig. 11 is a transverse section on line 11—11 of Fig. 6;

2

Fig. 12 is a section on line 12—12 of Fig. 1; and

Fig. 13 is a section through a wing having a positive displacement blower of controllable output for supplying air to the jets at the leading and trailing edges of a lift increasing flap.

Referring to Fig. 1, 10 indicates the fuselage of an airplane having wings 12 and 14, each provided with inboard trailing edge flaps 16 and outboard ailerons 18. The airplane also has the usual empennage including horizontal stabilizers 20 and 22 provided with elevators 24 pivoted to their trailing edges, a vertical fin 26 and a rudder 30.

A propeller 32 is driven through gearing 34 (Fig. 6) from a single stage gas turbine 36 forming part of a gas turbine-jet engine generally indicated at 38. The engine 38 comprises an axial flow compressor 40 which is driven by the turbine 36, burners 42 and a main propulsive jet conduit 44 terminating in discharge nozzles 44a discharging on either side of the fuselage beneath the wings. Air entering the annular air inlet 46 at the nose of the fuselage passes through the compressor 40 from which it is discharged into the annular compressed air chamber 48, part of the air from this chamber being diverted through a duct 50 at the bottom of the fuselage for the directional or lift control devices hereinafter described. A pilot controlled main butterfly valve 52 is provided in the duct 50 (Fig. 6) for controlling the volume of air thus diverted from the chamber 48. The greater part of the air flowing through the engine passes from chamber 48 into the combustion chamber where it is mixed with fuel and burned in burners 42 and discharged into the jet conduit 44.

As shown most clearly in Figs. 1 and 6 the duct 50 downstream of the main valve 52 communicates through pipes 52a with two oppositely extended spanwise ducts 53 and 54 in wings 12 and 14 respectively. These ducts extend along the leading edge of the wings to the wing tips, and are separated from the remainder of the wing interiors by spanwise partitions 56 and 58 which are provided with a series of apertures 60 along their length as best shown in Fig. 1.

Chordwise partitions 64 and 66 are provided in the wind compartments aft of the partitions 56 and 58 to provide separate compartments 68 and 70 which communicate with the leading edges of flaps 16 and the ailerons 18 respectively. The three apertures 60 in each of the partitions 56 and 58 which communicate with compartments 70 leading to the ailerons are fitted with auxiliary valves 74 (Fig. 12), herein shown as of the annular damper type, which have their movable elements interconnected for simultaneous operation by rods 76 which are connected to the stick 77 in the pilot's compartment. In the neutral position of the stick the auxiliary valves 74 in both wings are in a half-open position, as shown in Fig. 12, so that movement of the stick to the left will close the valves 74 in wing 14 and fully open the auxiliary valves 74 in wing 12, thus providing the same differential operation of the valves 74 of wings 12 and 14 as is provided for the ailerons 18 thereof.

The duct 50 also extends rearwardly along the bottom of the fuselage, as shown most clearly in Fig. 6, and communicates through apertures 78 with chambers 80 in the stabilizer 20 and 22. The duct 50 also communicates through apertures 82 with chamber 84 in fin 26. The discharge of the compressed air in chambers 68 and 70 of the wings and chambers 80 and 84 of the tail is controlled in each instance by pivoted control surfaces, comprising pivoted aft sections of the main airfoil surfaces and carried by the trailing edges of the main surfaces containing these chambers as will now be described.

Considering first one of the lift increasing flaps 16, the hollow flap 16 associated with wing 12 is pivoted to the trailing edge of the lower surface of wing 12 at 86 (Fig. 7) and has an upper leading edge surface 88 which is adjacent the trailing edge of the upper surface of the wind to provide an unbroken airfoil surface for the wing when the flap is in its normal position in which it is aligned with the wing, and to provide a jet directing slot 90 when the flap is moved down from its normal position into the position shown in Fig. 7.

The flap 16 also has a constantly open jet directing slot 92 at its trailing edge which is in fluid communication through the hollow flap with chamber 68. The slot 92 is controlled by a jet controlling valve, or flap, 94 hinged to the trailing edge of the upper surface of the flap 16 at 95. The operating means for the jet controlling flap 94, as shown in Fig. 4, may comprise a rod 96 having one end pivoted at 97 to the flap and having its other end pivoted to the main wing structure at a point 98 slightly aft of the pivot point 86 for flap 16 so that the jet controlling flap 94, as a result of lowering movement of flap 16, is moved from the dotted position shown in Fig. 4, in which the jet issuing from the slot 92 is rearwardly directed along the chord line of the wing, into the full line position thereof as shown in this figure in which the flap 94 deflects the jet downwardly relative to the chord line of the wing.

Fig. 8 shows a section through wing 12 and its ailerons 18. The latter as usual is movable above and below a neutral position relative to the wing by usual aileron operating mechanism connecting to one of the rods 76 for operating the auxiliary valves 74 differentially and connected to the pilot controlled stick 77 as previously explained.

In Fig. 5 the aileron is shown, on an enlarged scale, in full lines in its neutral position and in dotted lines in its extreme deflected positions and illustrates the jet directing slots formed at the leading and trailing edges thereof. It will be noted that in the neutral position of the aileron leading edge slots are provided at 100 and 102 between the leading edge of the aileron and the trailing edges of the upper and lower main wing surfaces respectively while a tab 104 pivoted at 105 on the aileron provides upper and lower jet directing slots 106 and 108 between the tab and the upper and lower aileron surfaces at the trailing edges thereof. The tab 104 has a horn 107 which is connected by a rod 110 with an ear 112 on the fixed wing structure so that as the aileron is moved up or down from its neutral position the tab 104 is likewise moved up or down relative to the aileron as will be evident from the dotted line position shown in Fig. 5. Here it will be noted that in the up position of the aileron the tab 104 has been moved to a position in which it deflects the jet issuing from slot 106 upwardly while the slot 108 is closed by tab 104. Also the jet directing slot 100 between the aileron and the upper surface of the wing is closed in the full up position of the aileron. In the down position of the tab 104 the jet issuing from slot 108 is deflected downwardly by the tab 104 and the slots 106 and 102 are closed.

The rudder 30 similarly opens and closes jet directing slots for the directional control of the aircraft as it pivots about its vertical axis 114. As shown in Fig. 10, the jets are selectively laterally directed on opposite sides of the longitudinal axis of the plane instead of being directed in an upward and downward direction as described in connection with the aileron in Fig. 5. In this instance (Fig. 10), the passage of compressed air from chamber 84 in fin 26 is permitted to flow through a slot 27 in the leading edge of the rudder 30 and thence rearwardly out of the trailing edge of the rudder and over the surfaces of the deflection tab which is pivotally attached adjacent to said trailing edge; the flow of fluid being similar to that described heretofore in connection with the aileron in Fig. 5.

The elevators 24 (Fig. 9) on stabilizers 20 and 22 also control jet directing slots similar to those described in connection with the ailerons 18 previously described (Fig. 5), these flaps being operated in unison in the usual manner to provide longitudinal control for the aircraft.

In Figs. 2 and 2a a modified construction is shown in which a flap 16a is provided with a trailing edge jet controlling flap 94a similar to that described in connection with Fig. 7. In this modification, however, the curved surface 88a on the upper hinge surface of the flap is struck on an arc about the center 86a so that in all positions of the flap a continuous upper wing and flap surface is maintained. Also in this modified construction the flap 94a is constantly biased into the full line position of Figs. 2 and 2a by a torsion spring 94b and is operated against the bias of the spring by a pilot controlled pull chord 94c independently of movement of the flap 16a. It will be noted in Figs. 2 and 2a that flap 94a forms a continuation of the upper surface of flap 16a thereby terminating in a trailing edge which is spaced downstream from the terminating edge of the lower surface of flap 16a to form an orifice. The flap 94a is then moved across the orifice to control the jet issuing therefrom. This form of independently controlled flap could obviously be used in the Fig. 7 construction.

In the modification shown in Fig. 3 the trailing edge jet directing slot is eliminated while the leading edge slot 90 formed by the separation of the upper flap surface 88 from the trailing edge of the upper wing surface is identical with the construction described in Fig. 7.

In Fig. 13 a further modification has been shown in which a wing 116 has a positive displacement blower 118 therein which draws off boundary layer air from the top surface of the wing through a duct at 120 and discharges the same through the duct 122 through leading and trailing edge slots 90 and 92 of a lift increasing flap 16 similar to that described in connection with Fig. 7. The blower 118 may be driven by the engine or in any other suitable manner.

In the operation of the lift increasing flap shown in cross section in Fig. 7, it will be evident that when the valve 52 is open, pressure air from wing chamber 68 is discharged through the slot 90 and also through the slot 92. The jet issuing from the slot 90 accelerates the boundary layer on the upper surface of the wing compensating energy losses and also increasing the lift of the wing and delaying stalling of the wing. The jet issuing from the slot 92, by reason of its deflection by flap 94, is also largely instrumental in controlling the boundary layer over the top of the wing, since it produces a low pressure at the trailing edge of the flap and thus holds the flow along the surface. In the horizontal position of flap 16 shown in dotted lines in Fig. 4 the jet issuing from the slot 92 is directed rearwardly and acts principally as a propulsion jet.

In the operation of the ailerons, pressure air from chambers 70 is discharged through the upper and lower leading edge slots 100 and 102 in the neutral position of the aileron shown in full lines in Fig. 5 to energize the boundary layer on the upper and lower wing surfaces while, as the aileron is moved upwardly, the lift increasing discharge through slot 100 is decreased until it is finally cut off in the extreme up position of the aileron shown in dotted lines. At the same time the discharge through slot 102 continues, thus tending to decrease the lift of the wing; and the trailing edge discharge through slots 106, 108 is varied as indicated in this figure to provide additional control due to the upwardly directed discharge through slot 106. In moving the aileron to its lowermost position the slot 102 is closed while slot 100 remains open to provide additional lift, and the trailing edge slot 108 is fully opened as tab 104 moves into position to close slot 106 and to direct the discharge downwardly from slot 108, these forces all tending to control the main airflow so as to provide additional lift.

Wings 12, 14 are arranged in the usual manner relative to the center of gravity of the aircraft so that the lift L of the wings, acting vertically upward through the center of pressure thereof, is displaced slightly to the rear of the center of gravity. Thus the lift L and the airplane weight W, which acts vertically downward through the center of gravity, impose a diving moment on the aircraft, and this moment is counteracted in the usual manner by air loads acting on the horizontal tail surfaces 20, 22 and 24. The boundary layer energizing means associated with flaps 16 and ailerons 18 increase the wing lift and consequently increase the diving tendency, but the boundary layer energizing means associated with the horizontal tail surfaces 20, 22 and 24 increase the air load on these surfaces sufficiently to counteract the increase in the diving moment imposed by the wing boundary layer energizing devices. Therefore, when butterfly valve 52 is open the aircraft will be longitudinally balanced yet this balance will not be lost or adversely affected by the closing of valve 52 or the failure of the fluid supply because if the lift created by the boundary layer energizing means on the wing is lost for some reason its compensating air load on the tail simultaneously disappears.

It will thus be evident that improved fluid jet means have been provided to give both directional control and lift control for an aircraft. It will be further evident that improved means have been provided for controlling the fluid jets by the movements of auxiliary control surfaces to provide new and improved results in aircraft control.

Finally it has been made possible as a result of the present invention to provide the improved directional and lift control means above described while at the same time retaining the inherent longitudinal stability of the airplane regardless of whether or not these additional control means are in operation.

While several embodiments of the invention have been shown for purposes of illustration, it will be evident that various changes may be made in the construction and arrangement of the parts without departing from the scope of the invention as defined by the following claims.

I claim:

1. In an aircraft, a fixed surface having a fluid conducting passage therein, a movable control surface having a fluid conducting passage therein communicating with the passage in said fixed surface and terminating in a jet directing orifice at its trailing edge, said control surface being pivoted at the trailing edge of said fixed surface and movable about its pivot from a neutral position relative to said fixed surface into positions on either side of a neutral position, means carried by said control surface at its leading edge and cooperating with said fixed surface for providing jet directing slots between said surfaces in the neutral position of said movable surface, said means cooperating with said fixed surface to restrict said upper slots when said control surface is moved above neutral position and to restrict said lower slot when said control surface is moved below said position, and means for supplying fluid under pressure to said communicating passages.

2. In an aircraft, a main airfoil having a duct therein, an auxiliary airfoil pivoted at the trailing edge of said main airfoil and having an interior duct communicating with the duct of said main airfoil, the duct of said auxiliary airfoil terminating in a rearwardly projecting jet directing orifice at its trailing edge, and means pivotally mounted at said second mentioned trailing edge and movable in response to movements of said auxiliary airfoil for deflecting said jet an amount proportional to and in response to pivotal movement of said auxiliary airfoil.

3. In an aircraft, a main airfoil having a chamber therein, an auxiliary airfoil pivoted at the trailing edge of said main airfoil having a chamber communicating with said first mentioned chamber and terminating at its trailing edge in a jet directing orifice, a tab pivotally supported in said orifice and subdividing the same into upper and lower orifices, and means for operatively connecting said tab with said main airfoil for restricting one of said orifices while deflecting the jet issuing from the other as said auxiliary airfoil is moved about its pivot from neutral position.

4. In an aircraft, a main airfoil having a chamber therein, an auxiliary airfoil pivoted at the trailing edge of said main airfoil having a chamber therein communicating with said main airfoil chamber, the adjacent surfaces of said main and auxiliary airfoils forming jet directing slots on the upper and lower surfaces thereof and said auxiliary airfoil terminating in a jet directing slot at its trailing edge, a tab pivotally mounted in said trailing edge slot and providing upper and lower jet orifices above and below said tab, and means responsive to pivotal movement of said auxiliary airfoil for moving said tab to close one of said trailing edge orifices while deflecting the discharge issuing from the other of said orifices, means on said auxiliary airfoil for restricting one of said leading edge slots simultaneously with pivotal movement of said auxiliary airfoil, and means for supplying fluid under pressure to said communicating airfoil chambers.

5. In an aircraft, a fuselage, a wing carried by said fuselage, an inboard trailing edge flap on said wing having a chamber, an outboard trailing edge aileron on said wing having a chamber, passages in said wing communicating separately with said chambers in said flap and said aileron, means for supplying fluid under pressure in said passages, and jet directing orifices at the trailing edges of said flap and aileron supplied with pressure fluid by said passages and controlled by movements of said aileron and flap.

6. In an aircraft, a fuselage, wings having trailing edge control surfaces including ailerons and flaps, an empennage having horizontal and vertical fixed airfoil surfaces and movable control surfaces including elevators and a rudder pivotally mounted at the trailing edges of said fixed surfaces, a source of pressure fluid, ducts leading from said pressure source through said wings and fuselage to the several control surfaces on said wings and empennage and terminating in jet directing orifice means, means on said control surfaces for controlling said orifice means, main valve means operable to control the flow of pressure fluid to said orifice means, and auxiliary valve means in the ducts leading to said orifices associated with said ailerons connected in series with the main valve means for controlling the flow of fluid to said ailerons whenever said main valve means are open, said auxiliary valve means being connected to the pilot operated stick and being in a half-open position in the neutral position of the stick, whereby to effect differential operation of said auxiliary valves upon opposite lateral movements of the stick.

7. In an aircraft, a main airfoil having a duct therein, an auxiliary airfoil pivoted at the trailing edge of said main airfoil and having an interior duct communicating with the duct of said main airfoil, said airfoils having continuous upper surfaces and having their ducts connected with a flexible joint which is substantially airtight throughout the range of movement of said auxiliary airfoil, the upper surface of said auxiliary airfoil terminating in a trailing edge and the lower surface of said auxiliary airfoil terminating upstream of said trailing edge to form a jet directing orifice, the duct in said auxiliary airfoil communicating with the duct in said main airfoil and terminating at said orifice, means providing fluid under pressure to said ducts for ejection through said orifice, means including a member movably mounted adjacent said second mentioned trailing edge and carried by one of said surfaces, and means for moving said member transversely of the airstream through said orifice for controlling the jet issuing therefrom.

8. In an aircraft, a main airfoil having a duct therein, an auxiliary airfoil pivoted at the trailing edge of said main airfoil and having an interior duct communicating with the duct of said main airfoil, said airfoils having continuous upper surfaces and having their ducts connected with a flexible joint which is substantially airtight throughout the range of movement of said auxiliary airfoil, the upper surface of said auxiliary airfoil terminating in a trailing edge and the lower surface of said auxiliary airfoil terminating upstream of said trailing edge to form a jet directing orifice, the duct in said auxiliary airfoil communicating with the duct in said main airfoil and terminating at said orifice, means providing fluid under pressure to said ducts for ejection through said orifice, means including a member movably mounted adjacent said second mentioned trailing edge and carried by the upper surface of said auxiliary airfoil, and means for moving said member for controlling the jet issuing from said orifice.

JOHN G. LEE.

REFERENCES CITED

The following references are of record in the file of this patent:

UNITED STATES PATENTS

| Number | Name | Date |
| --- | --- | --- |
| 1,491,954 | Jacobs | Apr. 29, 1924 |
| 1,772,196 | Wallace | Aug. 5, 1930 |
| 2,049,573 | Stalker | Aug. 4, 1936 |
| 2,069,047 | Ray | Jan. 26, 1937 |
| 2,071,744 | Anathor-Henrickson | Feb. 23, 1937 |
| 2,223,744 | Stalker | Dec. 3, 1940 |
| 2,252,528 | Sikorsky | Aug. 12, 1941 |
| 2,352,062 | Zap | June 20, 1944 |
| 2,372,030 | Stalker | Mar. 20, 1945 |
| 2,372,301 | Stalker | Mar. 27, 1945 |
| 2,406,919 | Stalker | Sept. 3, 1946 |
| 2,406,923 | Stalker | Sept. 3, 1946 |

FOREIGN PATENTS

| Number | Country | Date |
| --- | --- | --- |
| 518,663 | Great Britain | Mar. 5, 1940 |